United States Patent
Zhu et al.

(10) Patent No.: US 12,480,855 B2
(45) Date of Patent: Nov. 25, 2025

(54) METHOD FOR DETERMINING A DENSITY MEASUREMENT READING AND CORIOLIS MASS FLOW TRANSMITTER FOR CARRYING OUT THE METHOD

(71) Applicant: Endress+Hauser Flowtec AG, Reinach (CH)

(72) Inventors: Hao Zhu, Freising (DE); Gerhard Eckert, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 365 days.

(21) Appl. No.: 18/255,265

(22) PCT Filed: Nov. 26, 2021

(86) PCT No.: PCT/EP2021/083172
§ 371 (c)(1),
(2) Date: May 31, 2023

(87) PCT Pub. No.: WO2022/117457
PCT Pub. Date: Jun. 9, 2022

(65) Prior Publication Data
US 2024/0003798 A1 Jan. 4, 2024

(30) Foreign Application Priority Data
Dec. 1, 2020 (DE) ...................... 10 2020 131 769.7

(51) Int. Cl.
*G01N 9/32* (2006.01)
*G01F 1/84* (2006.01)

(52) U.S. Cl.
CPC .............. *G01N 9/32* (2013.01); *G01F 1/8422* (2013.01); *G01F 1/8477* (2013.01)

(58) Field of Classification Search
CPC .... G01N 9/32; G01N 9/002; G01N 2009/006; G01F 1/8422; G01F 1/8477; G01F 1/8413; G01F 1/8436; G01F 15/185
See application file for complete search history.

(56) References Cited

U.S. PATENT DOCUMENTS

2011/0113896 A1* 5/2011 Drahm ..................... G01F 15/00
73/861.357
2020/0049543 A1* 2/2020 Rieder ..................... G01N 11/16
(Continued)

FOREIGN PATENT DOCUMENTS

CA 2809710 A1 * 3/2012 ........... G01F 1/8477
CN 107110752 A * 8/2017 ........... G01F 1/8472
(Continued)

*Primary Examiner* — Francis C Gray
(74) *Attorney, Agent, or Firm* — Kelly J. Smith; Endress+Hauser (USA) Holding, Inc.

(57) ABSTRACT

A density measurement reading of a medium is determined using a Coriolis mass flow transmitter with two oscillators with pairs of measuring tubes arranged one above the other in parallel flow and leading into collectors. The mounting of the transmitter in the pipeline causes mechanical voltages that influence the oscillators via the collectors. The method includes excitation of a vibration mode of the oscillators and a determination of the natural frequency of the excited vibration modes. The method also includes a determination of a preliminary density measurement reading based on the natural frequencies and a deviation between the preliminary density measurement readings. A corrected density measurement reading is determined using a model, which determines and corrects the influence of mechanical voltages on the density measurement based on the deviation.

11 Claims, 2 Drawing Sheets

(56) References Cited

U.S. PATENT DOCUMENTS

| | | | | |
|---|---|---|---|---|
| 2020/0319007 A1* | 10/2020 | Zhu | ................... | G01F 25/10 |
| 2022/0065676 A1* | 3/2022 | Rieder | ................ | G01F 1/8422 |
| 2023/0341247 A1* | 10/2023 | Kirst | ................ | G01F 1/8431 |

FOREIGN PATENT DOCUMENTS

| | | | | |
|---|---|---|---|---|
| DE | 112004000269 T5 | 1/2006 | | |
| DE | 102011010178 A1 * | 8/2012 | ........... | G01F 1/8413 |
| DE | 10201510493 A1 | 6/2016 | | |
| DE | 102016007905 A1 * | 1/2018 | ............ | G01F 25/10 |
| DE | 102016112002 A1 | 1/2018 | | |
| DE | 102016125616 A1 | 6/2018 | | |
| DE | 102018112002 A1 | 11/2019 | | |
| DE | 102018133318 A1 | 6/2020 | | |
| DE | 102019106762 A1 | 6/2020 | | |
| EP | 1659389 A1 | 5/2006 | | |
| WO | WO-2020088837 A1 * | 5/2020 | ............ | G01F 15/02 |

\* cited by examiner

METHOD FOR DETERMINING A DENSITY MEASUREMENT READING AND CORIOLIS MASS FLOW TRANSMITTER FOR CARRYING OUT THE METHOD

CROSS-REFERENCE TO RELATED APPLICATIONS

The present application is related to and claims the priority benefit of DPMA Patent Application No. 10 2020 131 769.7, filed on Dec. 1, 2020, and International Patent Application No. PCT/EP2021/083172, filed Nov. 26, 2021, the entire contents of which are incorporated herein by reference.

TECHNICAL FIELD

The present disclosure relates to a method for determining a density measurement reading of a medium using a Coriolis mass flow transmitter with two oscillators mounted in a pipeline, and to such a Coriolis mass flow transmitter for mounting in a pipeline and for carrying out the method according to the invention.

BACKGROUND

Generic flowmeters are disclosed, for example, in DE 10 2015 104 931 A1. Generic transmitters are calibrated at the factory and installed in a measuring point in the calibrated state. Through this installation, mechanical voltages can act on the transmitter so that the oscillators are minimally out of tune, which has a particular effect on frequency-dependent density measurement. The object of the present invention is, therefore, to find a remedy here.

SUMMARY

The method according to the invention is used to determine a density measurement reading of a medium by means of a Coriolis mass flow transmitter mounted in a pipeline, which has at least two oscillators, each comprising at least two measuring tubes oscillating against one another, wherein the measuring tubes of a first of the oscillators extend above the measuring tubes of a second of the oscillators, wherein the measuring tubes are arranged in parallel flow and lead on the inlet side and outlet side into collectors, wherein the mounting of the transmitter in the pipeline causes mechanical voltages that influence the oscillators via the collectors, wherein the medium is guided in the measuring tubes, wherein the method comprises the following steps:
  Excitation in each case of at least one vibration mode of the first oscillator and the second oscillator;
  Determination of the respective natural frequency of the excited vibration modes;
  Determination in each case of a preliminary density measurement reading on the basis of the respective natural frequencies;
  Determination of a deviation between the preliminary density measurement readings;
  Determination of a corrected density measurement reading by means of a model that determines and corrects the influence of mechanical voltages on the density measurement on the basis of the deviation.

In more detailed investigations into the effects of mechanical voltages caused by the installation of the transmitter in a measuring point, the inventors of the present invention have found that the mechanical voltages have different effects on the two oscillators; that is, they are out of tune to varying degrees. This causes them to produce different preliminary density values for a medium passing through them. Insofar as the deviations of the two preliminary density measurement readings from one another correlate with the absolute value of the out-of-tune conditions, the extent of the voltage-dependent out-of-tune conditions can be determined and corrected according to the invention.

In a further development of the invention, the model models the influence of mechanical voltages in the form of bending moments.

In a further development of the invention, the model models the influence of the bending moments on the oscillators under the assumption that the bending moments have axes that extend perpendicular to a longitudinal axis of the transmitter, and that extend in the direction of the oscillations of the oscillators.

In most measuring points, the transmitters are arranged in such a way that the measuring tubes oscillate in a horizontal plane. That is, according to the above definition, that the axis of the bending moments is also horizontal, is particularly true if influences of gravity due to tolerances in the support of the pipeline lead to sagging or to excessively supported pipeline sections to which the transmitter is connected. This could be the most frequent cause of installation-related out-of-tune conditions, which are corrected with the method according to the invention.

In a further development of the invention, an effective density measurement reading is determined as the mean value or mean value of the preliminary density measurement readings weighted by the respective flow rate through the measuring tubes of the oscillators, wherein the corrected density measurement reading is determined on the basis of the effective density measurement reading and a correction term, which is determined on the basis of the deviation.

In a further development of the invention, the corrected density measurement reading is determined on the basis of both preliminary density values and correction terms assigned to them in each case, which are determined on the basis of the deviation.

In a further development of the invention, at least one correction term comprises a polynomial of the deviation, in particular a polynomial of the first or second degree.

In a further development of the invention, at least one correction term is added to the effective density measurement reading.

In a further development of the invention, there is a check of whether the medium is single-phase, wherein the density measurement reading corrected by means of the model is determined only for single-phase media.

In a further development of the invention, the first bending vibration mode of the oscillators is excited in each case, wherein the preliminary density measurement readings are determined on the basis of the natural frequencies of such bending vibration modes.

In a further development of the invention, the corrected density measurement reading does not deviate from the actual density of the medium by more than 0.5 kg/m$^3$, in particular not more than 0.3 kg/m$^3$, in particular not more than 0.2 kg/m$^3$.

The Coriolis mass flow transmitter according to the invention for mounting in a pipeline, comprises: at least two oscillators, each of which comprises at least two measuring tubes capable of oscillating relative to one another, wherein, in the installed state, the measuring tubes of a first of the oscillators extend above the measuring tubes of a second of the oscillators, wherein the measuring tubes are arranged in parallel flow and lead on the inlet side and outlet side into collectors, wherein the mounting of the transmitter in the pipeline can cause mechanical voltages that influence the oscillators via the collectors, wherein measuring tubes serve for conducting a medium whose density is to be determined with the Coriolis mass flow transmitter, wherein the Coriolis mass flow transmitter further has a measuring and operating circuit in order to carry out the method according to one of the preceding claims with the Coriolis mass flow transmitter.

BRIEF DESCRIPTION OF THE DRAWINGS

The present disclosure is now explained in more detail on the basis of the exemplary embodiments shown in the figures. The following are shown.

DETAILED DESCRIPTION

Figure 1:
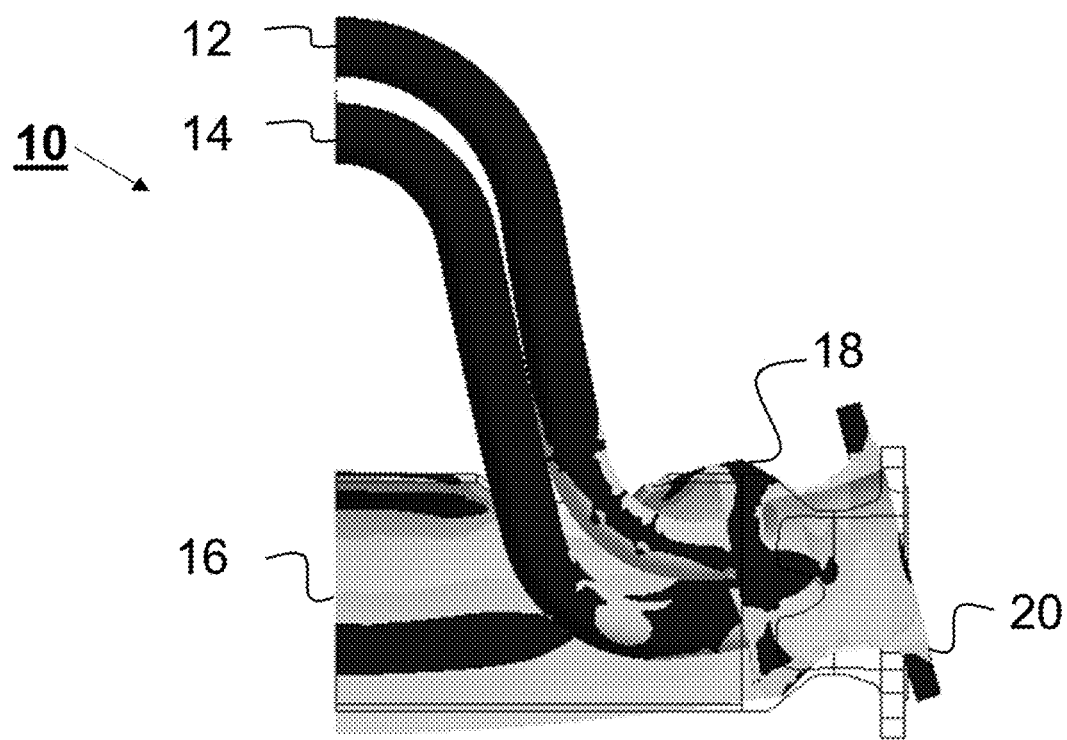
FIG. 1 shows an exemplary voltage distribution in a transmitter.

FIG. 1 shows exemplary simulation results for mechanical voltages in a generic transmitter for an installation position in a pipeline, if bending moments are introduced into the transmitter 10 due to tolerances in the support of the pipeline. In FIG. 1, only one quarter of the transmitter 10 is shown, wherein it can be assumed that the mechanical voltages in the parts not shown are formed to be substantially mirror-symmetrical for the voltage distribution in the quarter shown with respect to a transverse plane and a longitudinal plane of the transmitter. Quantitative details are not important in the presentation of voltages. It is only important to note that greater mechanical voltages occur in brightly displayed zones of a component than in darkly displayed zones of the component.

The transmitter 10 comprises an outer oscillator 12 with two parallel-guided, curved measuring tubes, and an inner oscillator 14 with two parallel-guided, curved measuring tubes, wherein the measuring tubes on the inlet side and outlet side each lead into a collector 18, which supports a flange 20 for mounting the transmitter 10 in a pipeline. The two collectors 18 are connected to one another by a rigid support tube 16.

In this connection, it is only to be noted that the mechanical voltages introduced on the measuring tubes of the outer oscillator 12 lead to a more extensive range with increased mechanical voltages than on the measuring tubes of the inner oscillator 14, as is directly shown by a comparison of the brightly illustrated areas. Therefore, stronger voltage-dependent, out-of-tune conditions can be expected for the outer oscillator 12 than for the inner oscillator 14.

Figure 2:
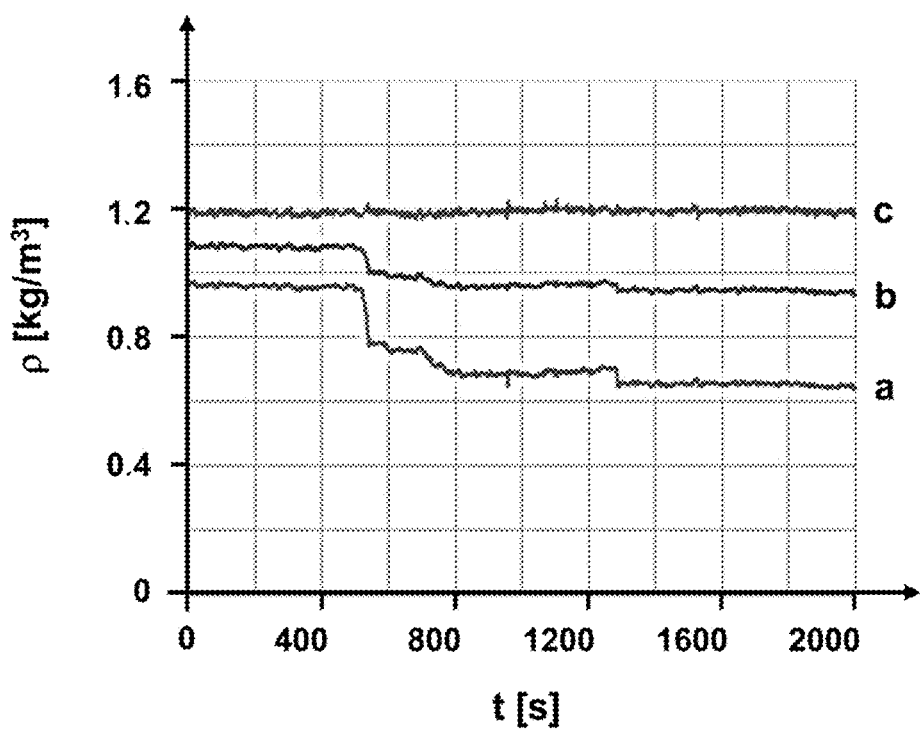
FIG. 2 shows a diagram of preliminary and corrected density measurement readings at variable mechanical voltages.

This expectation is confirmed by the measurement results in FIG. 2, which shows density measurement readings during the installation of a mass flow transmitter in a pipeline, wherein with increasing time the initiated voltages became greater. The transmitter was filled with air under normal conditions, so a density of approximately 1.2 kg/m³ had to be measured.

The curve (a) shows preliminary density measurement readings of the outer oscillator, while the curve (b) shows preliminary density measurement readings of the inner oscillator. As expected, the density readings of the outer oscillator deviate more from the set point than those of the inner oscillator.

Finally, the curve (c) shows a density measurement reading corrected with the method according to the invention, which satisfactorily corresponds to the set point.

Figure 3:
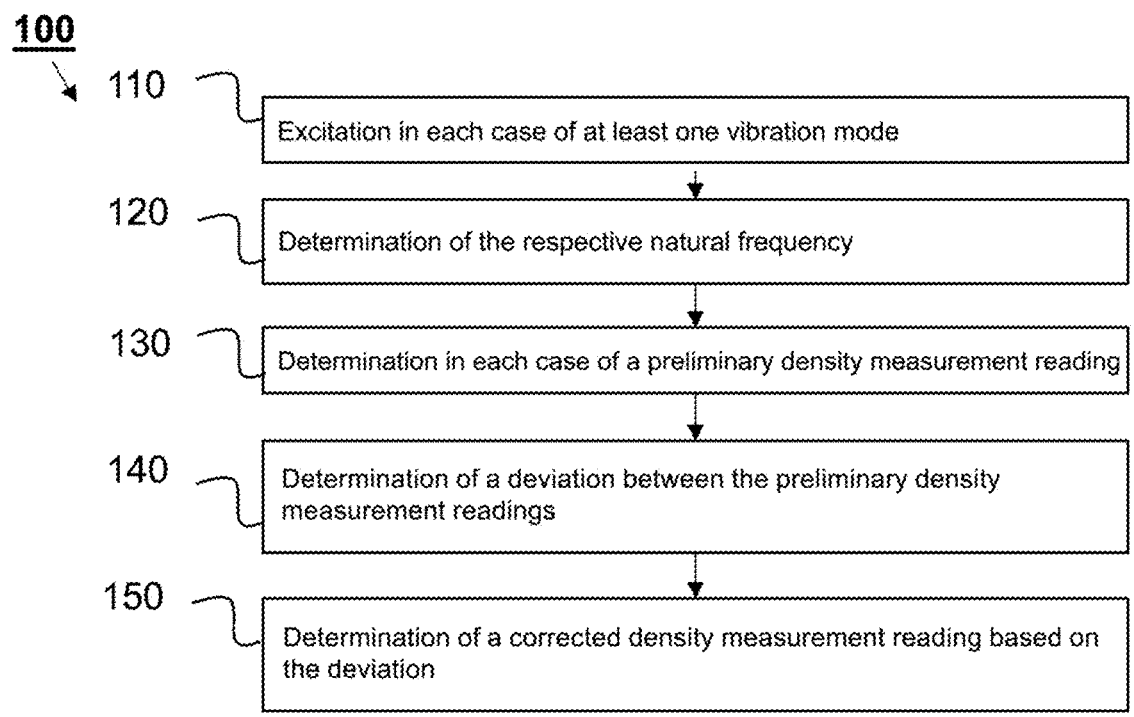
FIG. 3 shows flow diagram of an exemplary embodiment of the method according to the present disclosure.

The method according to the invention is now explained in more detail based on a flow diagram of an exemplary embodiment shown in FIG. 3. The method 100 begins to excite at least one vibration mode of the first oscillator and the second oscillator (110), wherein, as a rule, the fundamental mode of bending vibration is excited, that is, the mode in which the excited mode has no vibration nodes and which has the lowest natural frequency of all vibration modes of the respective oscillator. In a second step, the respective natural frequency of the excited vibration modes (120) is determined. This is followed by the determination of a preliminary density measurement reading (130) on the basis of the respective natural frequencies. For a voltage-free installed transmitter, the two preliminary density measurement readings should be substantially the same. However, if there are deviations and it can be ruled out that such deviations have other causes, such as the gas loading of a liquid medium, then a deviation is indicative of an influence of mechanical voltages on the density measurement. Therefore, in a next step, a deviation between the preliminary density values (140) is determined. On this basis, a corrected density measurement reading (150) is finally determined by means of a model that determines and corrects the influence of mechanical voltages on the density measurement on the basis of the deviation. In general, the correction function can be a polynomial in the difference of the density measurement readings, wherein a sufficient measuring accuracy can be achieved with a linear function of the deviation or a polynomial of a second degree. The procedure with linear terms is explained below, but it can be used with polynomials accordingly.

Initially, a corrected partial density measurement reading can be determined for each oscillator, according to $$\rho_{corr,i} = \rho_{vorl,i} + a_i \cdot \rho_{diff} + b_i,$$

where i=1, 2 is an index for the first or second oscillator and $\rho_{vorl,i}$ is the preliminary density measurement reading of the respective oscillator, where $a_i$ and $b_i$ are oscillator-specific coefficients, and where $\rho_{diff}$ is the deviation between the preliminary density measurement readings. The resulting corrected partial density measurement readings $\rho_{vorl,i}$ for the oscillators should substantially match. As a corrected density measurement reading $\rho_{corr}$, an average of the two density component measurement readings $\rho_{corr,i}$ can then be output, optionally weighted by the respective mass flow rates through the measuring tubes of the oscillators.

The density measurement readings corrected by the method according to the invention do not deviate from the actual density of the medium by more than 0.5 kg/m³, in particular not more than 0.3 kg/m³, in particular not more than 0.2 kg/m³.

Figure 4:
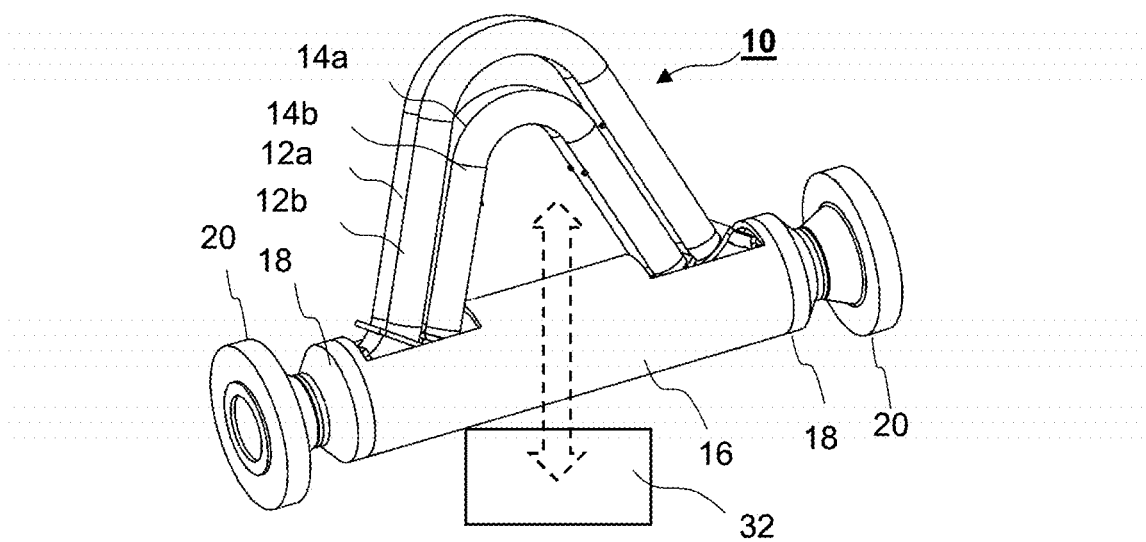
FIG. 4 shows an exemplary embodiment of the method according to the present disclosure.

The exemplary embodiment of a transmitter according to the invention 10 shown in FIG. 4 comprises an outer oscillator 12 with two parallel-guided, curved measuring tubes 12a, 12b, and an inner oscillator 14 with two parallel-guided, curved measuring tubes 14a, 14b, wherein the measuring tubes on the inlet side and outlet side each lead into a collector 18, which supports a flange 20 for mounting the transmitter 10 in a pipeline. The two collectors 18 are connected to one another by a rigid support tube 16.

For the excitation of bending vibrations of the measuring tubes of the oscillators 12, 14, the transmitter for each oscillator has an electrodynamic dose (not shown here), which acts between the measuring tubes of the respective oscillator. In addition, the transmitter for each oscillator has an inlet-side and an outlet-side electrodynamic vibration sensor in order to detect the vibrations of the measuring tubes of the oscillator. Details of this are known to the person skilled in the art in principle and are explained in more detail, for example, in DE 10 2015 104 931 A1.

The transmitter according to the invention further comprises a measuring and operating circuit 32 with a computing unit to drive the exciter, to detect signals of the vibration sensors, and to carry out the method according to the invention.

The invention claimed is:

1. A method for determining a density measurement reading of a medium using a Coriolis mass flow transmitter mounted in a pipeline, which has at least two oscillators, each comprising at least two measuring tubes oscillating against one another, wherein the measuring tubes of a first of the oscillators extend above the measuring tubes of a second of the oscillators, wherein the measuring tubes are arranged in parallel flow and lead on the inlet side and outlet side into collectors, wherein the mounting of the transmitter in the pipeline causes mechanical voltages that influence the oscillators via the collectors, wherein the medium is guided in the measuring tubes, wherein the method comprises the following steps:
   excitation of at least one vibration mode of the first oscillator and the second oscillator;
   determination of the respective natural frequency of the excited vibration modes;
   determination of a preliminary density measurement reading on the basis of the respective natural frequencies;
   determination of a deviation between the preliminary density measurement readings;
   determination of a corrected density measurement reading by means of a model, which determines and corrects the influence of mechanical voltages on the density measurement on the basis of the deviation.

2. The method according to claim 1, wherein the model models the influence of the mechanical voltages in the form of bending moments.

3. The method according to claim 2, wherein the model models the influence of the bending moments on the oscillators under the assumption that the bending moments have axes that extend perpendicular to a longitudinal axis of the transmitter, and that extend in the direction of the oscillations of the oscillators.

4. The method according to claim 2, wherein an effective density measurement reading is determined as the mean value or mean value of the preliminary density measurement readings weighted by the respective flow rate through the measuring tubes of the oscillators, wherein the corrected density measurement reading is determined on the basis of the effective density measurement reading and a correction term, which is determined on the basis of the deviation.

5. The method according to claim 2, wherein the corrected density measurement reading is determined on the basis of both preliminary density values and correction terms assigned to them in each case, which are determined on the basis of the deviation.

6. The method according to claim 4, wherein at least one correction term comprises a polynomial of the deviation.

7. The method according to claim 4, wherein at least one correction term is added to the effective density measurement reading.

8. The method according to claim 1, wherein there is a check of whether the medium is single-phase, wherein the density measurement reading corrected using the model is determined only for single-phase media.

9. The method according to claim 1, wherein the first bending vibration mode of the oscillators is excited in each case, and preliminary density measurement readings are determined on the basis of the natural frequencies of such bending vibration modes.

10. The method according to claim 1, wherein the corrected density measurement reading does not deviate from the actual density of the medium by more than 0.5 kg/m$^3$.

11. A Coriolis mass flow transmitter for mounting in a pipeline, comprising:
   at least two oscillators, each of which comprises at least two measuring tubes capable of oscillating relative to one another, wherein, in the installed state, the measuring tubes of a first of the oscillators extend above the measuring tubes of a second of the oscillators, wherein the measuring tubes are arranged in parallel flow and lead on the inlet side and outlet side into collectors, wherein the mounting of the transmitter in the pipeline can cause mechanical voltages that influence the oscillators via the collectors, wherein measuring tubes serve for conducting a medium whose density is to be determined with the Coriolis mass flow transmitter, wherein the Coriolis mass flow transmitter further comprises a measuring and operating circuit with a computing unit, in order to carry out the following method with the Coriolis mass flow transmitter:
   excitation of at least one vibration mode of the first oscillator and the second oscillator;
   determination of the respective natural frequency of the excited vibration modes;
   determination of a preliminary density measurement reading on the basis of the respective natural frequencies;
   determination of a deviation between the preliminary density measurement readings;
   determination of a corrected density measurement reading by means of a model, which determines and corrects the influence of mechanical voltages on the density measurement on the basis of the deviation.

* * * * *